United States Patent
Fisher

(10) Patent No.: US 9,289,704 B2
(45) Date of Patent: Mar. 22, 2016

(54) FILTER ASSEMBLY

(71) Applicant: K&P Engineering, Inc., Littleton, CO (US)

(72) Inventor: Dave Fisher, Littleton, CO (US)

(73) Assignee: K&P Engineering, Inc., Littleton, CO (US)

( * ) Notice: Subject to any disclaimer, the term of this patent is extended or adjusted under 35 U.S.C. 154(b) by 273 days.

(21) Appl. No.: 14/032,005

(22) Filed: Sep. 19, 2013

(65) Prior Publication Data

US 2015/0076052 A1    Mar. 19, 2015

(51) Int. Cl.
*B01D 27/08* (2006.01)
*B01D 35/30* (2006.01)

(52) U.S. Cl.
CPC .............. *B01D 35/30* (2013.01); *B01D 27/08* (2013.01); *B01D 2201/04* (2013.01); *B01D 2201/0461* (2013.01); *B01D 2201/302* (2013.01); *B01D 2201/306* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 2,471,069 A * | 5/1949 | Le Clair | 210/423 |
| 2,511,800 A * | 6/1950 | Wilkinson | 210/249 |
| 3,640,390 A * | 2/1972 | Goy et al. | 210/130 |
| 6,006,924 A * | 12/1999 | Sandford | 210/440 |
| 7,101,479 B2 * | 9/2006 | Stockbower | 210/232 |
| 7,413,089 B1 * | 8/2008 | Tidwell | 210/443 |

OTHER PUBLICATIONS

KPEngineering_2008_Clean_Install_Twist_Lock_Style K&PEngineering.com (2008); Cleaning & Installation—Assembly Instructions—Twist Lock Style; Website [Online] Available Web site: http://www.kandpengineering.com/assembly_twist.shtml; Last Update: Oct. 5, 2013; Accessed on: Apr. 16, 2014.
KPEngineering_2010_Product_Catalog_S17-19_S43 K&PEngineering.com (2010); Product Catalog S17-19, S43; Website [Online] Available Web site: http://www.kandpengineering.com/S17.shtml; Last Update: Jun. 15, 2013; Accessed on: Apr. 16, 2014.
KPEngineering_2013_Dealer_Info_Brochure K&PEngineering.com (2013); Dealer Information Brochure; Website [Online] Available Web site: http://www.kandpengineering.com/doc/KP%20Brochurec%2010-07.pdf; Last Update: Mar. 8, 2013; Accessed on: Apr. 16, 2014.

* cited by examiner

*Primary Examiner* — Thomas M Lithgow
(74) *Attorney, Agent, or Firm* — Swanson & Bratschun, L.L.C.

(57) ABSTRACT

A modular filter assembly for use in a fluid filtering system comprising a housing for a filter media. The housing has an open end and a closed end. The modular filter assembly further comprises a collar for attachment to the open end of the housing. The collar defines a collar orifice. A removable locking element is configured to be received at the collar orifice. The modular filter assembly also comprises cooperating structure between the collar and the removable locking element for releasably attaching the removable locking element to the collar for selective access to the filter media within the housing. The housing can be one of a plurality of select lengths to receive a filter media that is a corresponding one of several lengths.

15 Claims, 6 Drawing Sheets

SECTION I-I

FILTER ASSEMBLY

TECHNICAL FIELD

The present disclosure is directed towards filter assemblies and more particularly toward fluid filter assemblies.

BACKGROUND

The overwhelming majority of oil filters made, sold, and used throughout the world utilize a single piece housing. In order to remove a filter element from a traditional paper/glass filter assembly one must cut the filter housing apart. If the filter assembly is reusable, one must somehow disassemble the filter housing in order to remove the filter element from the housing. The reusable filter assembly then must have the housing reassembled to make a complete functioning unit. This process is very time intensive and typically requires the use of tools and disassembling the filter housing.

One type of reusable assembly uses a single piece housing having an integrally formed collar defining an orifice. A removable locking element is provided and a cooperating structure between the locking element and the integrally formed collar allows the locking element to be locked and unlocked from the integrally formed collar to provide selective access to a filter element within the housing. Manufacturing of a single piece of housing having an integrated collar is cumbersome and it is difficult to provide tolerances necessary for a long life filter assembly. It is also expensive and time intensive. Further, manufacturing a single piece housing having an integrated collar for a reusable filter assembly limits the interchangeability of sub parts across multiple filter assemblies.

The present embodiment described herein is intended to overcome one or more of the problems discussed above.

SUMMARY OF THE INVENTION

A first aspect is a modular filter assembly. The modular filter assembly comprises a housing for a filter media. The housing has an open end and a closed end. The modular filter assembly further comprises a collar for attachment to the open end of the housing. The collar may be attached to the housing with a threaded connection, a welded connection, a press-fit connection, an adhesive connection or combinations thereof. The collar defines a collar orifice. A removable locking element is configured to be received at the collar orifice. The modular filter assembly also comprises cooperating structure between the collar and the removable locking element for releasably attaching the removable locking element to the collar for selective access to a filter media within the housing. The housing can be one of a plurality of select lengths to receive a filter media that is a corresponding one of several lengths. The filter media may comprise natural or synthetic materials such as steel wool, metal meshes, sintered metal, cotton, other natural or synthetic materials or combinations thereof.

A second aspect is a modular filter assembly comprising a cylindrical filter element with a first and a second open end. The cylindrical filter element is received in a housing which has an open end and a closed end. The housing may be one of a plurality of select lengths to receive the cylindrical filter element that is a corresponding one of several select lengths. A collar defining a collar orifice engages about the open end of the housing and the collar orifice constricts the open end of the housing. The connection between the collar and the housing could be at least one of a threaded connection, a welded connection, a pressfit connection, or an adhesive connection. The collar orifice is sized to axially receive the cylindrical filter element. The modular filter assembly further comprises a removable locking element having a central bore. The removable locking element is configured to releasably engage with the collar and mate with the first open end of the cylindrical filter element with the central bore in communication with an interior of the cylindrical filter element to releasably secure the cylindrical filter element inside the housing. A filter plate is configured to mate with the second open end of the cylindrical filter element. The filter plate may be a check valve or a solid plate and it may be configured to releasably engage with the second open end of the cylindrical filter media. The modular filter assembly further comprises a biasing element which is operatively associated between the filter plate and the bottom of the housing to bias the cylindrical filer element into contact with the removable locking element.

Another aspect is a method of providing a filter for a filtering application that includes providing a plurality of filter housings, each filter housing having an open end and a closed end. Each filter housing is one of several select lengths and each filter housing has a common opening diameter. A collar is provided and configured for attachment to an open end of each of the plurality of housings. The collar defines a collar orifice which constricts the opening of each of the plurality of filter housings. A removable locking element is provided to be received in the collar orifice. A filter media is provided and the filter media length corresponds to the length of one of the filter housings. The cross-section of the filter media is configured for axial insertion into the collar orifice. A housing is then selected to correspond to the length of the filter media. The collar is attached to the open end of the selected housing. The step of attaching the collar to the open end of the selected housing may comprise at least one of threading, welding, press-fitting, or adhering using an adhesive. The filter media is axially inserted into the collar orifice. The removable locking element is placed in the collar orifice. Cooperating structure is used to releasably attach the removable locking element to the collar orifice to contain the filter media in the housing.

The method may further comprise providing a collar defining a collar orifice that has radial notches adjacent to the collar orifice. The collar may further define radial cavities in an inner surface of the collar adjacent to the collar orifice. The radial cavities are offset along the inner diameter of the collar orifice from the radial notches of the collar orifice. In such an embodiment, a removable locking element is provided that has a plurality of circumferential teeth extending radially and each tooth is configured to be received in the corresponding radial notch adjacent to the collar orifice. The circumferential teeth of the removable locking element are then received in the radial notches of the collar orifice to extend through the collar; the removable locking element is rotated about its axis to align the circumferential teeth with the radial cavities. The circumferential teeth are then received in the radial cavities wherein upon receipt of the circumferential teeth in the radial cavities the removable locking element is locked against axial rotation and the removable locking element can only be moved axially toward the bottom of the housing until the circumferential teeth clear the radial cavities.

The method may further comprise the filter media being cylindrical and having a first and a second open end. The removable locking element is configured to releasably mate with the first open end of the cylindrical filter media. The cooperating structure may consist of a filter plate configured to releasably mate with the second open end of the cylindrical filter media and a biasing element operatively associated between the filter plate and the bottom of the housing to bias the filter media into contact with the removable locking element. The removable locking element is mated with the first open end of the filter media. The filter plate is mated with the second open end of the filter media. The biasing element is operatively associated between the filter plate and the bottom of the housing and cooperates with the removable locking element to prevent axial rotation of the locking element.

The housing and collar when combined allow the removal and reinstallation of a filter media without disassembling the outer filter housing or its components. The housing and collar can remain as one part during the release and removal of the filter element from the complete filter assembly. Manufacturing of the present embodiments is faster, less expensive, and enables closer tolerances. The collar may be used with housings of various lengths and corresponding filter media of various lengths. The removable locking element and filter media may be removed from the housing without the use of tools. Further, many of the subparts, such as the collar, the removable locking element, and the filter plate can be interchangeable across multiple filter assemblies

DETAILED DESCRIPTION

Figure 1:
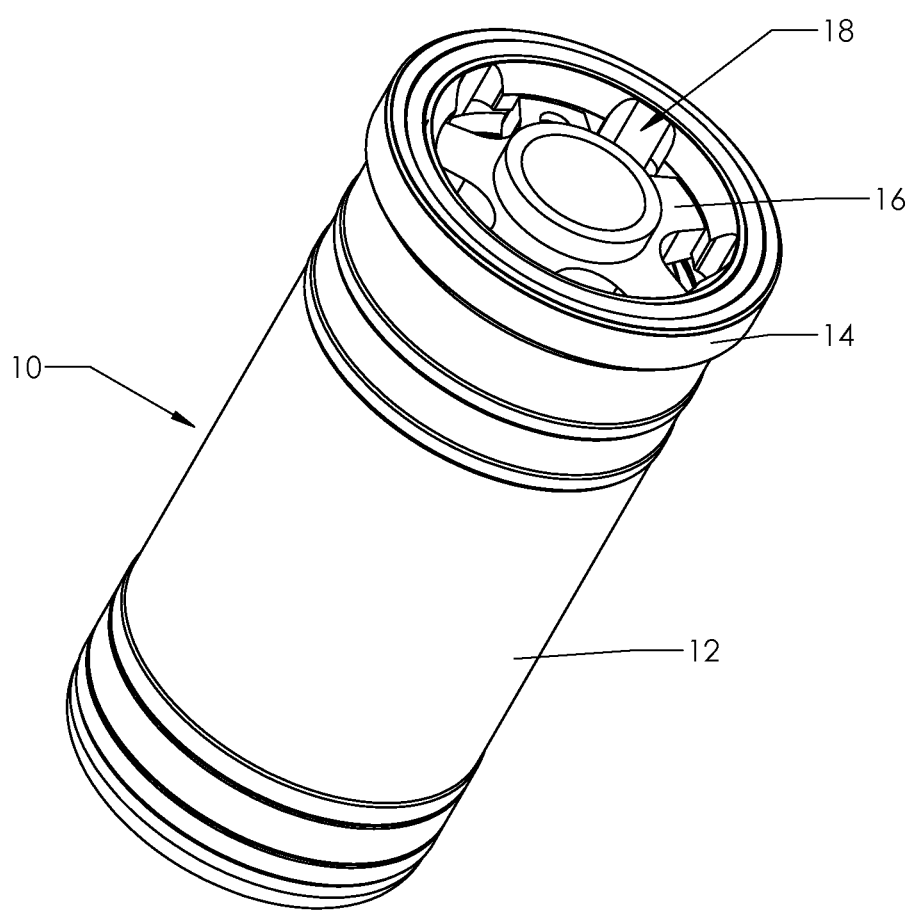
FIG. 1 is a perspective view of an embodiment of a fully assembled filter assembly in accordance with the present disclosure.

An embodiment of a fully assembled filter assembly 10 is illustrated in FIG. 1. The filter assembly 10 may be used to filter fluids, which include liquids and/or gases. The fully assembled filter assembly 10 has a housing 12 attached to a collar 14 and a removable locking element 16 received in an orifice 18 of the collar 14 in a fully locked position.

Figure 2:
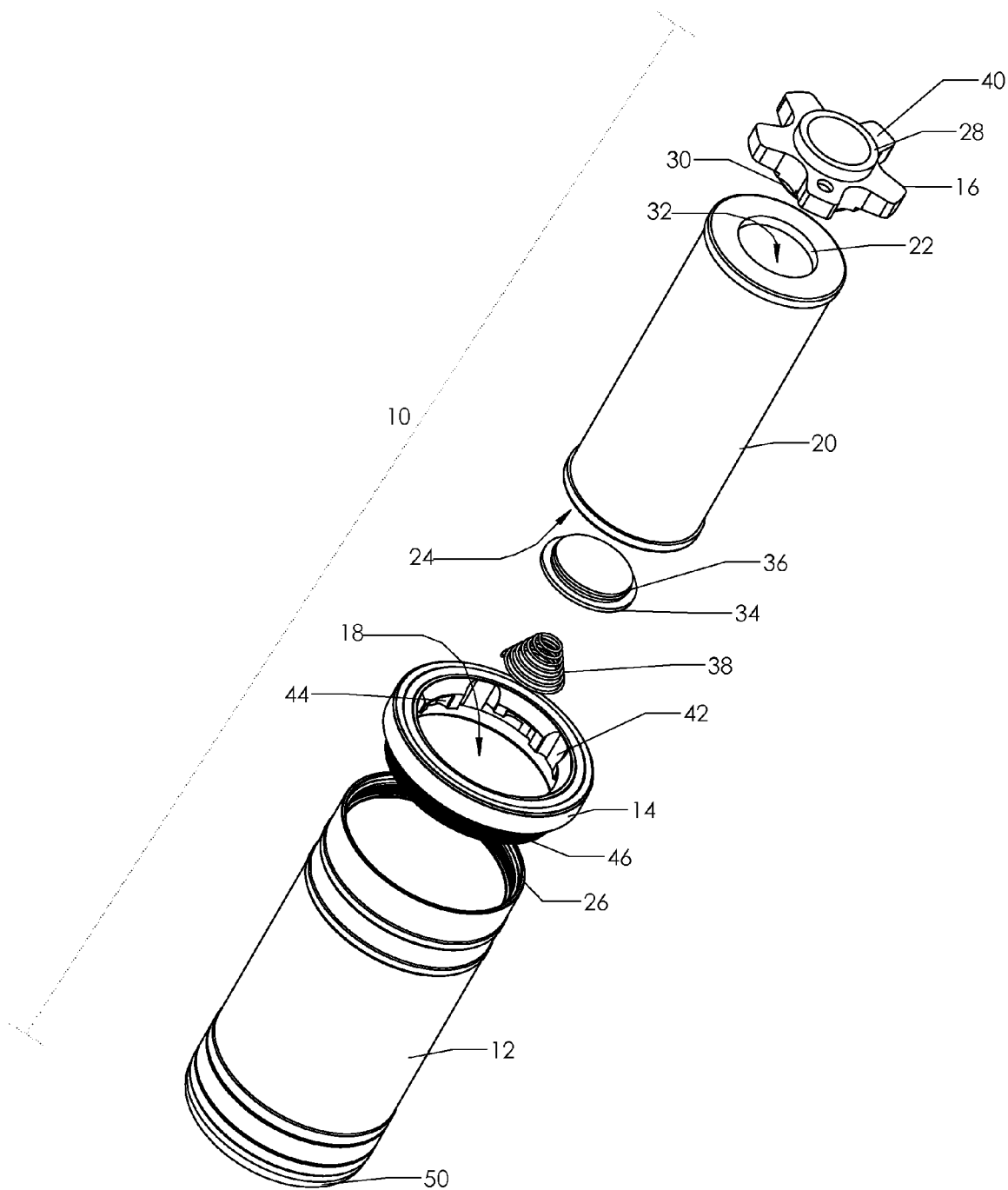
FIG. 2 is an exploded perspective view of the filter assembly of FIG. 1.

FIG. 2 is an exploded perspective view of the filter assembly 10 of FIG. 1. The filter assembly 10 includes a filter element or filter media 20. The filter element 20 may be composed of various filter media comprising natural or synthetic materials such as steel wool, metal meshes, sintered metal, cotton, other natural or synthetic materials or combinations thereof. The filter element 20 depicted herein is cylindrical and has a first opening 22 and a second opening 24. The filter element 20 may have different cross-sections provided the orifice 18 of the collar 14 has a mating cross-section. The housing 12 for the filter element 20 has an open end 26 and a closed end 50. The collar 14 is configured for attachment to the open end 26 of the housing 12. The collar 14 defines the collar orifice 18 which constricts the open end 26 of the housing 12 and is configured to axially receive the filter element 20. The removable locking element 16 has a central bore 28 and releasably engages with the collar 14. In some embodiments the removable locking element 16 may releasably mate with and seal the first opening 22 of the filter element 20 through the use of a removable locking element o-ring 30 (see FIG. 4) with the central bore 28 in communication with an interior 32 of the filter element 20. A filter plate 34 is configured to mate with the second opening 24 of the filter element 20. The filter plate 34 may have a filter plate o-ring 36 which allows the filter plate 34 to releasably mate with and seal the second opening 24 of the filter element 20. A first embodiment of the filter plate 34 could comprise a solid plate. Another embodiment of the filter plate 34 could comprise a check valve, for example a ball-check valve (not shown). A biasing element 38 is operatively associated between the filter plate 34 and the bottom of the housing 12 to bias the filter element 20 and the removable locking element 16 into contact with the collar 14. In the embodiment illustrated herein, the biasing element 38 is a conical coil spring. In other embodiments the biasing element 38 could be other configurations of a spring, a block of elastomeric material, a Belleville washer, or other devices alone or in combination for providing the desired biasing effect described in more detail below. Of course, if the filter element 20 does not have the second opening 24, the filter plate 34 may be omitted and the biasing element 38 can contact a bottom of the filter element 20.

One embodiment of the housing 12 has a common open end diameter, but the length of the housing is one of a plurality is select lengths to receive filter media 20 that is a corresponding one of several lengths. This provides the advantage of using several different lengths of filter media 20 in housings 12 of various lengths but still maintaining a common open end 26 diameter for the housing 12. Thus, the collar 14 may be manufactured to conform to a specific open end 26 diameter of the housing 12 and the same sized collar 14 can be used for various lengths of the housing and filter media. In other embodiments such collars 14 can be provided with different diameter orifices 18 to accommodate filter media 20 of varying diameters.

Figures 3, 4:
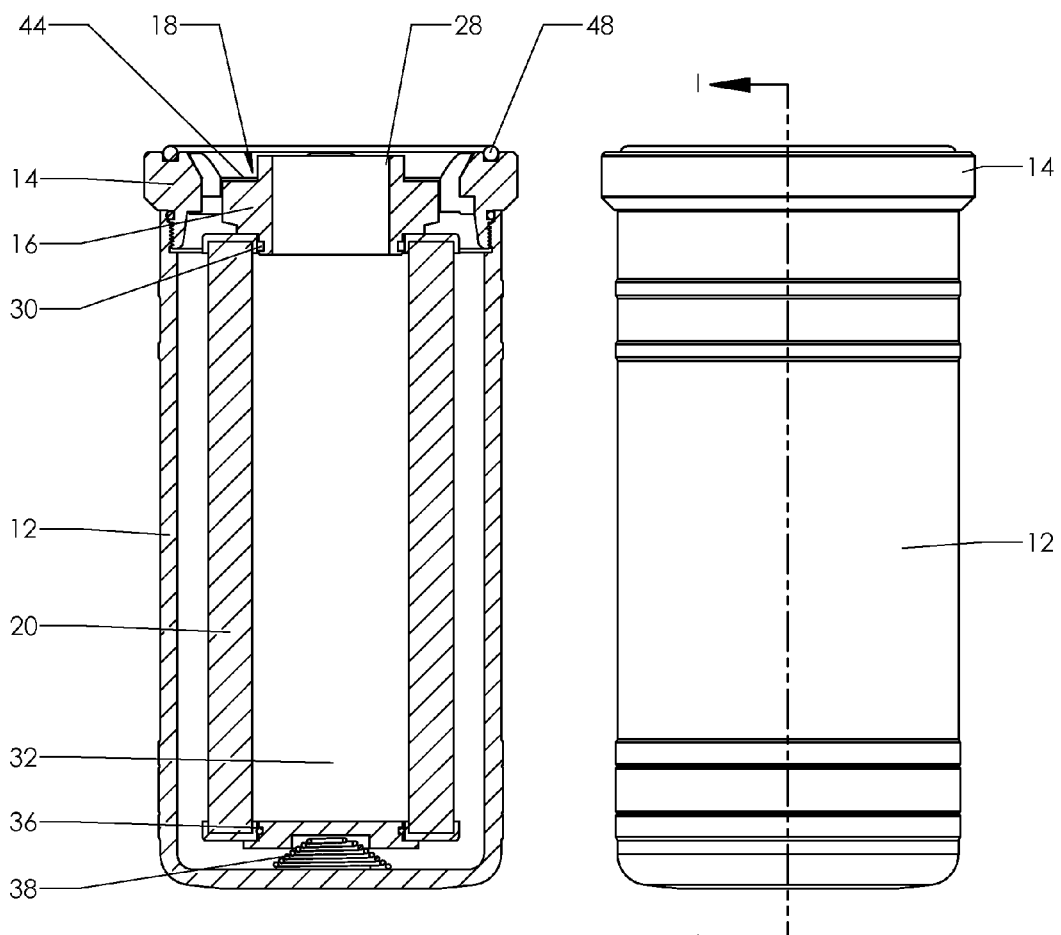
FIG. 3 is a front elevation view of the filter assembly of FIG. 1.
FIG. 4 is a cross-sectional view of the filter assembly of FIG. 1 taken along line 1-1 of FIG. 3.

As shown herein, the removable locking element 16 has a plurality of circumferential teeth 40 extending radially and each tooth is configured to be received in a corresponding radial notch 42 on an inner surface of the collar 14. Here, the removable locking element 16 has five teeth and the collar 14 has five corresponding notches 42. The collar 14 further defines a corresponding number of equally spaced radial cavities 44 in a bottom surface of the collar 14 adjacent to the collar orifice 18, wherein the radial cavities 44 are offset along the inner diameter of the collar orifice 18 from the radial notches 42 of the collar orifice 18. This is perhaps best viewed in FIG. 5. The circumferential teeth 40 of the removable locking element 16 can be received in the radial notches 42 and then extend from the bottom surface of the collar 14. The removable locking element 16 can then be rotated on its axis to align the circumferential teeth 40 with the radial cavities 44 and moved axially to receive the circumferential teeth 40 in the radial cavities 44. Once the circumferential teeth 40 have been received in the radial cavities 44 the removable locking element 16 can only be moved axially toward the housing bottom until the circumferential teeth 40 clear the radial cavities 44. As shown in FIG. 4, in an assembled state the biasing element 38 biases the circumferential teeth 40 in the radial cavities 44 of the collar orifice 18 to lock the removable locking element 16.

The central bore 28 of the removable locking element 16 has an inner diameter configured for releasable attachment to a source of fluid to be filtered which allows the filtration assembly 10 to be used in a plurality of different applications. As illustrated in the present embodiment, the central bore 28 of the removable locking element 16 is internally threaded to mate with male threads of a source of fluid to be filtered, for example, an engine. The removable locking element 16 may alternatively comprise externally threaded extension about the central bore 28 to mate with female threads of a source of fluid to be filtered. Other connection configurations as required by a source of fluids to be filtered may be incorporated in the filter assembly 10.

The removable locking element 16 and the filter plate 34 are configured to engage with filter media 20 of a variety of lengths. The removable locking element 16 and the filter plate 34 may be press-fit into the filter media 20. The connection between the removable locking element 16 and the filter media 20 and the filter plate 34 and the filter media 20 may also be one of a threaded connection, a welded connection, an adhesive connection or combinations thereof. A press-fit connection and seal can be achieved through the use of a removable locking element o-ring 30 and a filter plate o-ring 36. The o-rings 30 and 36 seal the first opening 22 and second opening 24 of the filter element to prevent fluid from leaking out of the first opening 22 and the second opening 24 of the filter element 20. Further, the o-rings 30 and 36 allow the removable locking element 16 and the filter plate 34 to releasably engage with the filter media 20. If the filter media 20 is disposable, this allows the removable locking element 16 and the filter plate 34 to be reused with the new filter media without having to dispose of both the removable locking element 16 and the filter plate 34. This also has the advantage that the removable locking element 16 and filter plate 34 may be removed from the filter element 20 without the use of tools making the process of removing the filter media 20 faster and less expensive.

FIG. 3 is a view of the fully assembled filter assembly 10. The collar 14 is fully attached to the housing 12 and the removable locking element 16 is locked in place with the collar orifice 18. FIG. 4 is a cross-sectional view of FIG. 3 taken along line 1-1. The removable locking element 16 has been fully received in the radial cavities 44 on the inner surface of the collar 14 and the biasing element 38 is fully biased locking the removable locking element 16 and the filter media 20 into the radial cavities 44 on the inner surface of the collar orifice 18. This prevents the locking element 16 from axial rotation and the removable locking element 16 can only be moved axially toward the bottom of the housing 12 against the action of the elastic element 38 until the circumferential teeth 40 of the removable locking element 16 clear the radial cavities 44.

A gasket 48 is also shown, in FIG. 4, to seal the collar 14 to a source of fluid to be filtered, which is not shown. The gasket 48 prevents fluid from leaking from the collar 14 into the area surrounding the filter assembly 10.

Figure 5:
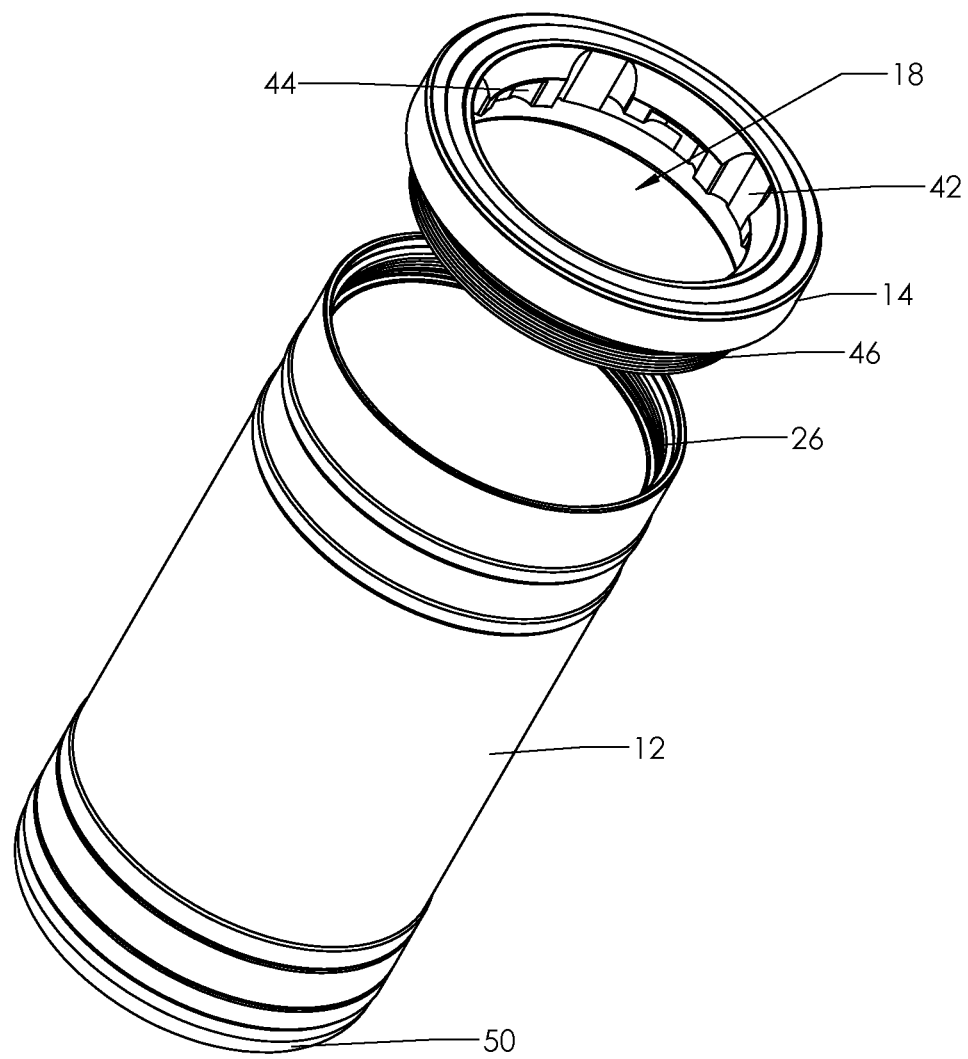
FIG. 5 is an exploded perspective view of the collar and housing of FIG. 1.

FIG. 5 is a perspective view of the collar 14 and housing 12 of FIG. 2. An outer diameter 46 of the collar 14 is threaded to engage with a threaded inner diameter of the open end 26 of the housing 12. This allows the collar 14 to releasably mate with the housing 12. The connection shown in FIG. 5 between the housing 12 and the collar 14 is a threaded connection. However, the invention is not limited to just a threaded connection. The connection between the housing 12 and the collar 14 could be one of a threaded connection, a welded connection, a press-fit connection, an adhesive connection or combinations thereof. The use of a threaded connection may allow the collar 14 to be removed easily from the housing 12. An adhesive could be applied to the threads to prevent removal of the collar from the housing.

Figure 6:
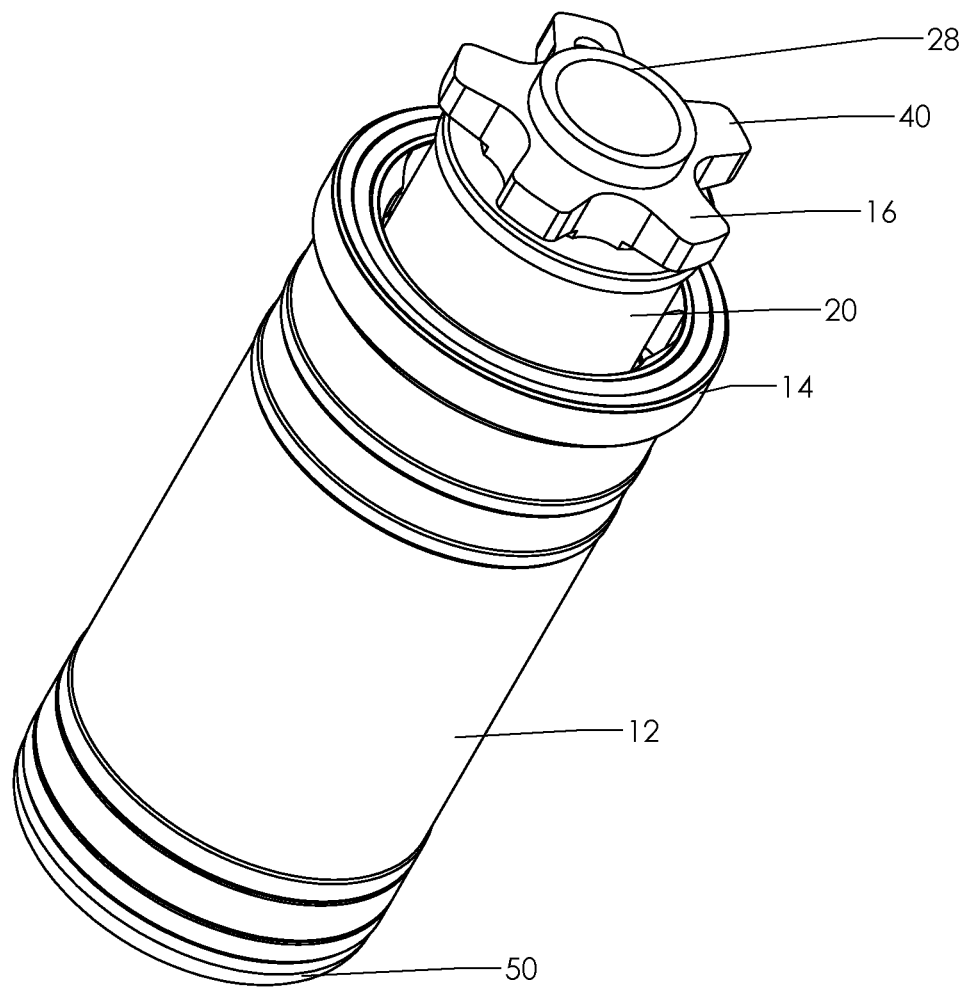
FIG. 6 is a partially exploded perspective view of the collar, housing, removable locking element, and filter media of FIG. 1.

FIG. 6 is a view of the filter media 20, housing 12, collar 14, and removable locking element 16 of FIG. 2. The collar 14 is fully attached to the housing 12 and the filter media 20 and the removable locking element 16 are being axially received through the collar orifice 18. FIG. 6 illustrates that the filter media 20 and the removable locking element 16 can be fully received through the collar orifice 18. The collar orifice 18 allows the removal and reinstallation of the filter media 20 without disassembling the housing 12 from the collar 14. Because the housing 12 does not have to be reassembled, removing or installing the filter media 20 is faster and less expensive.

Figure 7:
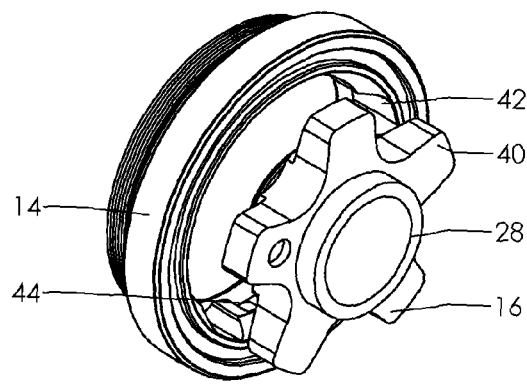
FIG. 7 is a perspective view of the collar and removable locking element in an aligned but disassociated position.
Figure 8:
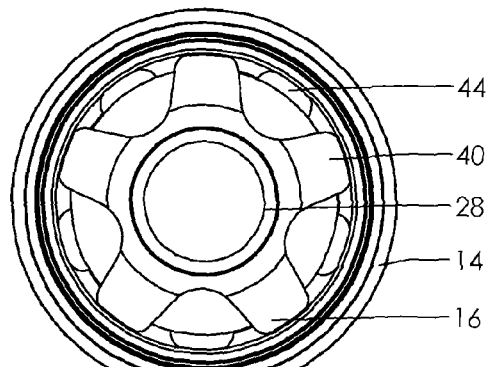
FIG. 8 is a top plan view of the collar and removable locking element in the aligned but disassociated position of FIG. 7.
Figure 9:
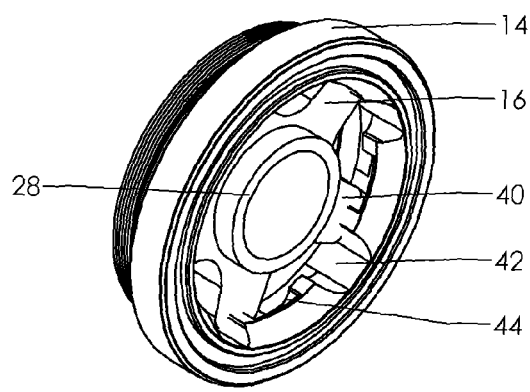
FIG. 9 is a perspective view of the collar and the removable locking element as the removable locking element is being engaged with the collar.
Figure 10:
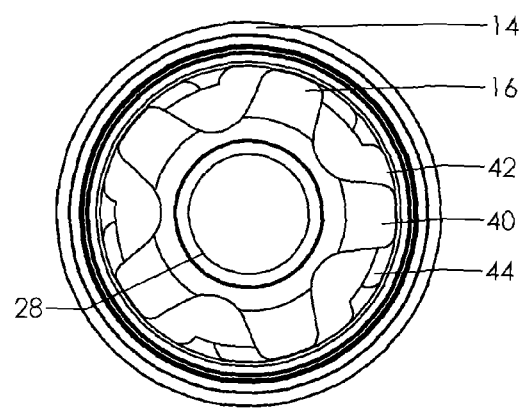
FIG. 10 is a top plan view of the collar and the removable locking element as the removable locking element is being engaged with the collar as shown in FIG. 9.
Figure 11:
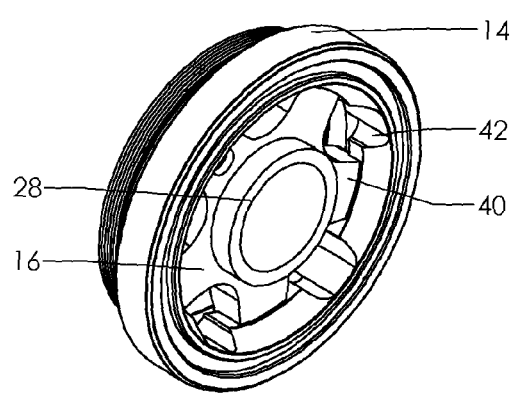
FIG. 11 is a perspective view of the collar and the removable locking element with the removable locking element in a fully locked in position.
Figure 12:
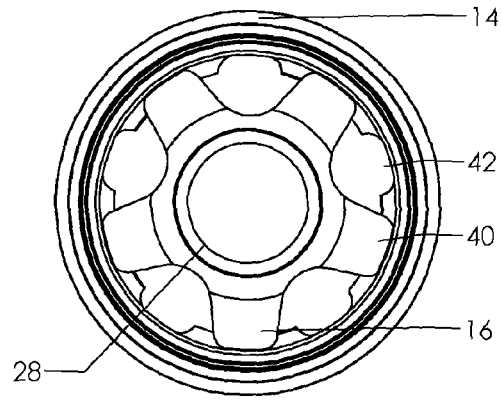
FIG. 12 is a top plan view of the collar and the removable locking element with the removable locking element in a fully locked in position as shown in FIG. 11.

FIGS. 7 through 12 show the interaction between the collar 14 and the removable locking element 16. FIGS. 7 and 8 show the collar 14 and the removable locking element 16 in an aligned but disengaged position. FIGS. 9 and 10 show the collar 14 and the removable locking element 16 as the removable locking element 16 is being engaged with the collar 14. The circumferential teeth 40 of the removable locking element 16 are received in the radial notches 42 to extend from the bottom surface of the collar 14. The removable locking element 16 can then be rotated on its axis to align the circumferential teeth 40 with the radial cavities 44 which are offset from the radial notches 42 and moved axially toward the top of the housing 12 to receive the circumferential teeth 40 in the radial cavities 44. FIGS. 11 and 12 show the collar 14 and the removable locking element 16 when the removable locking element 16 is fully locked in position. Once the circumferential teeth 40 have been received in the radial cavities 44 the removable locking element 16 can only be moved axially toward the bottom of the housing 12 until the circumferential teeth 40 clear the radial cavities 44. The biasing element 38, as shown in FIG. 4, secures the circumferential teeth 40 of the removable locking element 16 in the radial cavities 44 and cooperates with the removable locking element 16 to prevent axial rotation of the removable locking element 16. An advantage of this design is that the removable locking element 16 and the filter media 20 may be removed from the collar orifice 18 without the use of tools and without disassembling the filter housing 12.

The filter assembly disclosed herein can have application to a wide variety of apparatuses utilizing filter assemblies, including, but not limited to, motor vehicle or other engines, hydraulic pumps, coolant systems, bulk liquid processing, hot tubs, and air and water purification systems.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure. While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A modular filter assembly comprising:
   a filter media;
   a housing for receiving the filter media, the housing having an open end and a closed end;
   an annular collar configured for attachment to the open end of the housing to define an annular collar orifice constricting the open end of the housing;
   a removable locking element configured to be received in the annular collar orifice; and
   cooperating structure between the collar and the removable locking element for releasably engaging the removable locking element to the collar for selective access to a filter media within the housing, the cooperating structure comprising:
   the removable locking element having a plurality of circumferential teeth extending radially from a center axis of the removable locking element and each tooth is configured to be received in a corresponding radial notch, wherein the radial notch is in an inner surface of the annular collar adjacent the annular collar orifice, and
   the annular collar further defines radial cavities in an interior bottom surface of the annular collar adjacent to the annular collar orifice, wherein an upper surface of each radial cavity does not extend beyond a lip of the annular collar, and the radial cavities are radially offset along an inner diameter of the annular collar orifice from the radial notches of the annular collar orifice, wherein the circumferential teeth can be received in the radial notches to extend beyond the inner surface of the annular collar to clear the radial notches, and the removable locking element can then be rotated about the center axis of the locking element to align the circumferential teeth with the radial cavities of the annular collar and moved axially to receive the circumferential teeth in the radial cavities so that the removable locking element can only be moved axially toward the housing bottom until the circumferential teeth clear the radial cavities.

2. The modular filter assembly of claim 1, wherein the attachment between the housing and the annular collar is at least one of a threaded connection, a welded connection, a press-fit connection, or an adhesive connection.

3. The modular filter assembly of claim 1, wherein the removable locking element and the filter media can be removed without the use of tools.

4. The modular filter assembly of claim 1, wherein an inner diameter of a central bore of the removable locking element is configured for releasable attachment to a source of a fluid to be filtered.

5. The modular filter assembly of claim 4, wherein an inner diameter of the central bore of the removable locking element is threaded to conform to one of various engine requirements.

6. The modular filter assembly of claim 1, wherein the removable locking element is configured to releasably mate with a filter media.

7. The modular filter assembly of claim 1, wherein the housing is one of a plurality of select lengths to receive a filter media that is a corresponding one of several lengths.

8. A modular filter assembly comprising:
   a cylindrical filter element having a first and a second open end;
   a housing for receiving the cylindrical filter element, the housing having an open end and a closed end;
   an annular collar defining an annular collar orifice, the annular collar being configured for attachment with the housing about the open end with the annular collar orifice constricting the open end of the housing and being sized to axially receive the cylindrical filter element;
   a removable locking element having a central bore, the removable locking element being configured to releasably engage with the annular collar and mate with the first open end of the cylindrical filter element with the central bore in communication with an interior of the cylindrical filter element to releasably secure the cylindrical filter element inside the housing,
   wherein the removable locking element has a plurality of circumferential teeth extending radially from a center axis of the removable locking element and each tooth is configured to be received in a corresponding radial notch in an inner surface of the annular collar adjacent the annular collar orifice,
   wherein the annular collar further defines radial cavities in a bottom interior surface of the annular collar adjacent to the annular collar orifice, wherein an upper surface of each radial cavity does not extend beyond a lip of the annular collar, and the radial cavities are radially offset along an inner diameter of the annular collar orifice from the radial notches of the annular collar orifice, wherein the circumferential teeth can be received in the radial notches to extend beyond the inner surface of the annular collar to clear the radial notches, and the removable locking element can then be rotated about the center axis of the locking element to align the circumferential teeth with the radial cavities of the annular collar and moved axially to receive the circumferential teeth in the radial cavities so that the removable locking element can only be moved axially toward the housing bottom until the circumferential teeth clear the radial cavities;
   a filter plate configured to mate with the second open end of the cylindrical filter element; and
   a biasing element operatively associated between the filter plate and the closed end of the housing to bias the cylindrical filter element into contact with the removable locking element.

9. The modular filter assembly of claim 8, wherein the attachment between the housing and the annular collar is at least one of a threaded connection, a welded connection, a press-fit connection, or an adhesive connection.

10. The modular filter assembly of claim 8, wherein the biasing element biases the circumferential teeth of the removable locking element in the radial cavities on the annular collar to lock the removable locking element against axial rotation, wherein the removable locking element can only be moved axially toward the housing bottom against action of the biasing element until the circumferential teeth clear the radial cavities.

11. The modular filter assembly of claim 8, wherein the removable locking element and the cylindrical filter element can be removed without the use of tools.

12. The modular filter assembly of claim 8, wherein the housing is one of a plurality of select lengths to receive the cylindrical filter element that is a corresponding one of several select lengths.

13. A method of providing a filter for a filtering application comprising:

providing a plurality of filter housings, each having an open end and a closed end, the filter housings being of one of several select lengths each having a common opening diameter;

providing an annular collar configured for attachment to an open end of each of the plurality of housings to define an annular collar orifice constricting the opening of each of the plurality of filter housings;

providing a removable locking element configured to be received in the annular collar orifice;

providing a cooperating structure between the annular collar and the removable locking element for releasably attaching the removable locking element to the annular collar for selective access to an interior of a housing without the use of tools;

providing a filter media of a length corresponding to a length of one of the filter housings and a cross-section configured for axial insertion into the collar orifice;

selecting a housing for a corresponding length of the filter media;

attaching the collar to the open end of the selected housing;

axially inserting the filter media into the collar orifice;

placing the removable locking element in the collar orifice;

using the cooperating structure, releasably attaching the removable locking element to the collar orifice to contain the filter media in the housing, wherein the cooperation structure comprises:

the annular collar further comprising radial notches adjacent to the annular collar orifice, wherein the annular collar further defines radial cavities in an interior bottom surface of the annular collar adjacent to the annular collar orifice, wherein an upper surface of each radial cavity does not extend beyond a lip of the annular collar, and the radial cavities are radially offset along an inner diameter of the annular collar orifice from the radial notches of the annular collar orifice, and the removable locking element further comprising a plurality of circumferential teeth extending radially from a center axis of the removable locking element and each tooth being configured to be received in a corresponding radial notch in an inner surface of the annular collar adjacent the annular collar orifice; and the step of using the cooperating structure to releasably attach the removable locking element comprises:

receiving the circumferential teeth of the removable locking element in the corresponding radial notches of the annular collar orifice to extend through and clear the annular collar;

rotating the removable locking element about the center axis of the removable locking element to align the circumferential teeth with the radial cavities; and receiving the circumferential teeth in the radial cavities, wherein upon receipt of the circumferential teeth in the radial cavities the locking element is locked against axial rotation and the removable locking element can only be moved axially toward the bottom of the housing until the circumferential teeth clear the radial cavities.

14. The method of claim 13, wherein the step of attaching the collar to the open end of the selected housing comprises at least one of threading, welding, press-fitting or adhering using an adhesive.

15. The method of claim 13 further comprising:

the filter media being cylindrical and having a first and a second open end;

the removable locking element further comprising a central bore configured to releasably mate with the first open end of the cylindrical filter media;

the cooperating structure further comprising a filter plate configured to releasably mate with the second open end of the cylindrical filter media and a biasing element operatively associated between the filter plate and the bottom of the housing to bias the filter media into contact with the removable locking element;

mating the removable locking element to the first open end of the filter media;

mating the filter plate to a second opening of the filter media; and operatively associating the biasing element between the filter plate and the bottom of the housing, wherein with the circumferential teeth of the locking element received in the radial cavities, the biasing element cooperates with the locking element to prevent axial rotation of the locking element.

* * * * *